United States Patent Office 3,717,468
Patented Feb. 20, 1973

3,717,468
LIGHT-SENSITIVE SUPERSENSITIZED SILVER HALIDE EMULSIONS
Kaiichiro Sakazume and Shui Sato, Tokyo, Japan, assignors to Konishiroku Photo Industry Co., Ltd., Tokyo, Japan
No Drawing. Continuation of abandoned application Ser. No. 778,301, Nov. 22, 1968. This application May 21, 1971, Ser. No. 145,918
Int. Cl. G03c 1/14
U.S. Cl. 96—124
9 Claims

ABSTRACT OF THE DISCLOSURE

A new supersensitizing combination particularly useful for a green-light-sensitive gelatinous silver halide photographic emulsion comprising at least one carbocyanine dye of the general Formula 1 and at least one monomethine cyanine dye of the general Formula 2, said combination being so selected that at least one substituent on a nitrogen atom in a heterocyclic ring of the said two dyes has a carboxyalkyl or sulfoalkyl moiety. The general Formulas 1 and 2 are:

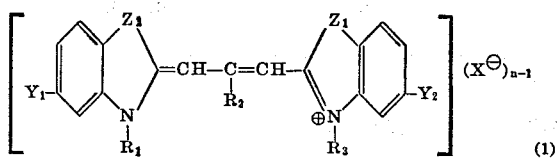

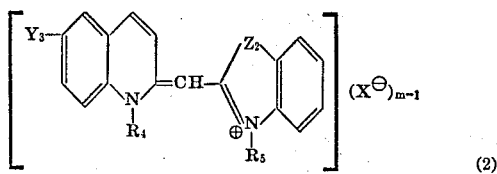

wherein $R_1$, $R_3$, $R_4$ and $R_5$ are each lower alkyl, substituted alkyl, hydroxyalkyl, substituted hydroxyalkyl or carboxyalkyl group or its derivative, or a sulfoalkyl group or its derivative; $R_2$ is lower alkyl group; $Z_1$ and $Z_2$ are each S or Se; $Y_1$ and $Y_2$ are each hydrogen, halogen, or lower alkyl group; $Y_3$ is hydrogen, lower alkyl or lower alkoxy group; X is an anion; and $n$ and $m$ are each 1 or 2.

---

This application is a continuation of Ser. No. 778,301, filed Nov. 22, 1968, now abandoned.

This invention relates to light-sensitive silver halide photographic emulsions in combination with two or more sensitizing dyes. More particularly, this invention relates to light-sensitive silver halide photographic emulsions which comprise the combination of at least one compound of the below-mentioned general Formula 1 and at least one compound of the below-mentioned general Formula 2, said combination being so selected that at least one substituent on a nitrogen atom in a heterocyclic ring of the additive compounds has a carboxyalkyl or sulfoalkyl moiety.

The general Formulas 1 and 2 are defined below.

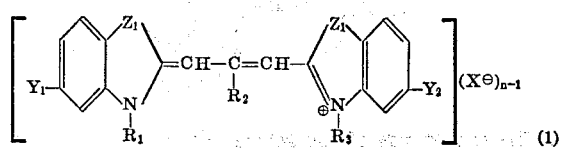

in which:

$R_1$, $R_3$, $R_4$ and $R_5$ are each lower alkyl, substituted alkyl, hydroxyalkyl, substituted hydroxyalkyl, carboxyalkyl, or a sulfoalkyl group or a derivative thereof;
$R_2$ is lower alkyl group;
$Z_1$ and $Z_2$ are each S or Se;
$Y_1$ and $Y_2$ are each hydrogen, halogen, or lower alkyl group;
$Y_3$ is hydrogen, lower alkyl or lower alkoxy group;
X is an anion; and
$n$ and $m$ are each 1 or 2.

The compounds of the general Formulas 1 and 2 are referred to hereinafter as a carbocyanine dye and a monomethine cyanine dye, respectively.

It is well known that supersensitization means increasing the spectral sensibility of a light-sensitive photographic layer by using, together with a principal sensitizing dye, an organic compound having a different structural formula from that of said dye. For sensitizing dyes which are employed in supersensitization of a silver halide photographic emulsion over the entire visible spectral region, the following conditions are required:

(1) To have a high color sensitization synergistic effect.
(2) To sensitize in an appropriate spectral region.
(3) To cause no injurious reaction with another photographic additive and to have no adverse influence on photographic properties during storage of film.
(4) To cause no color staining on a film treated with a developing solution.

In view of the above conditions, the prior supersensitization over the entire visible spectral region has been carried out by adding a combination of two or more sensitizing dyes to a silver halide photographic emulsion. However, the above four conditions have not yet been satisfied and the photographic properties of the emulsions according to the prior art are markedly reduced on account of fog and color staining caused by the presence of an anionic compound which is a gelatin coagulant (precipitating agent).

The object of the present invention is to provide light-sensitive silver halide photographic emulsion improved by supersensitization over the entire visible spectrum region satisfying the above conditions and causing no injurious effect on photographic properties such as fog and color staining even in the presence of a gelatin coagulant.

According to this invention, it has ben found that the addition of at least one compound of the general Formula 1 and at least one compound of the general Formula 2 to a silver halide photographic emulsion in such combination that at least one of the substituents on a nitrogen atom in a heterocyclic ring of these compounds has a carboxyalkyl or sulfoalkyl moiety, provides a light-sensitive silver halide photographic emulsion which is supersensitized over the entire visible spectrum region having excellent properties, namely, satisfying the above conditions and causing no harmful effect on photographic properties even in the presence of a gelatin coagulant.

Typical compounds of the general Formulas 1 and 2 are enumerated below. It should be noted that the compounds usable in this invention are not limited to these compounds.

The compounds represented by the general Formula 1 are:

(1) 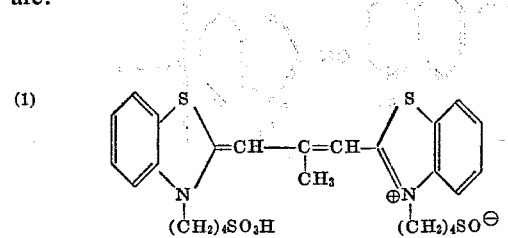

(2)

(3) 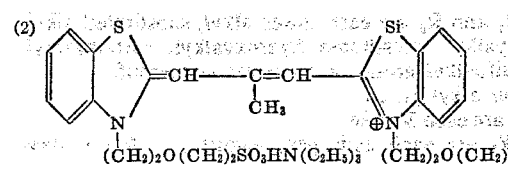

(4) 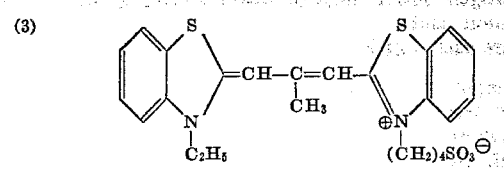

(5) 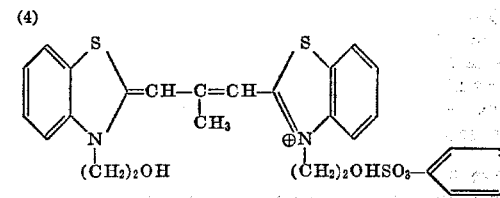

(6) 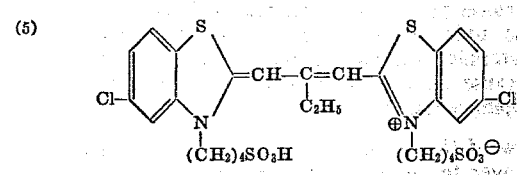

(7) 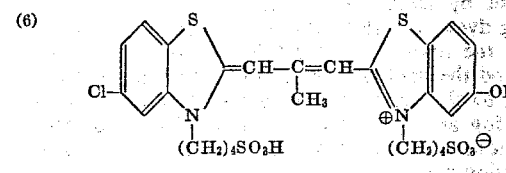

(8) 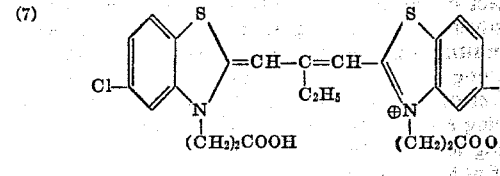

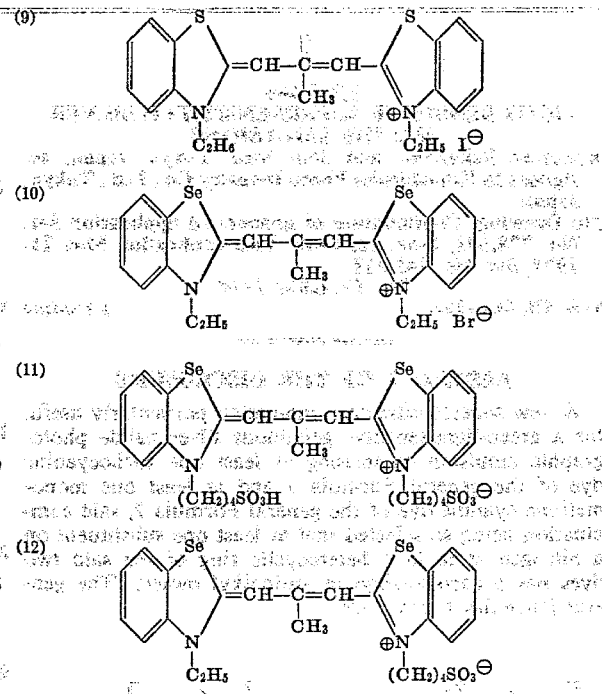

The compounds represented by the general Formula 2 are:

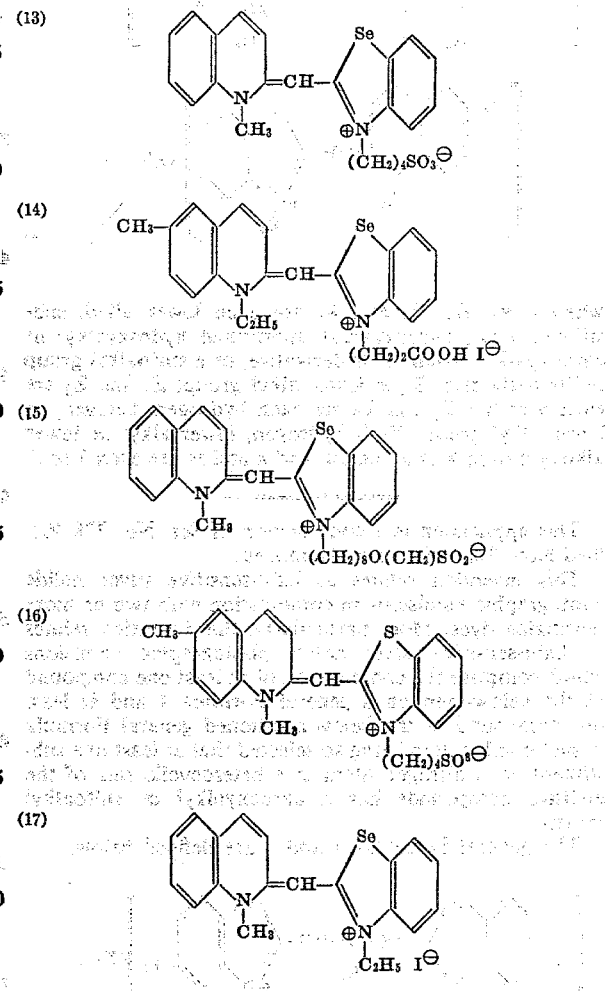

The compounds of the general Formulas 1 and 2 are combined according to the following modes of combination:

| Examples of combination | Compound of the general Formula 1 | Compound of the general Formula 2 |
|---|---|---|
| I | Compound 1 | Compound 13. |
| II | Compound 6 | Compound 16. |
| III | Compound 9 | Compound 13. |
| IV | Compound 5, Compound 11 | Compound 13. |
| V | Compound 4, Compound 11 | Compound 16. |
| VI | Compound 7, Compound 10 | Compound 13. |
| VII | Compound 9, Compound 12 | Compound 17. |
| VIII | Compound 5, Compound 11 | Compound 17. |
| IX | Compound 5, Compound 10 | Compound 17. |

In the present invention, combination of the compounds is not limited the above nine examples but any combination may be utilizable on condition that in the combination of at least one compound of the general Formula 1 and at least one compound of the general Formula 2, at least one of the substituents on a nitrogen atom in a heterocyclic ring has a carboxylalkyl or sulfoalkyl moiety. The excellent properties of the light-sensitive photographic emulsion according to this invention over those obtained by the prior art are brought about by such combination and such particular effects are considered to result from the fact that, in the above combination, at least one of the substituents on a nitrogen atom in a heterocyclic ring of the compounds represented by the general Formulas 1 and 2 has a carboxyalkyl or sulfoalkyl moiety. Consequently, such supersensitization that is not obtainable by the sole use of any one of the compounds is achieved and desirable color sensitization is brought about over the entire visible spectral region. For the above advantages, the combination of these compounds displays particularly excellent photographic reproduction as the spectral sensitizer for high speed panchromatic emulsion as well as for negative emulsion employed in ordinary photography.

In the attached drawing, the curve A is the spectral sensibility curve of a high speed silver bromoiodide emulsion and the curve B is the spectral sensibility curve of the high speed silver bromoiodide emulsion added with the compound 1 as the carbocyanine dye. The spectral sensibility curve of the above high speed silver bromoiodide emulsion added with the compound 15 as the monomethine cyanine dye is shown by curve C and the spectral sensibility curve of the said emulsion added with the compound 1 together with the compound 15 is shown by curve D. As is evident from the drawing, the high speed silver bromoiodide emulsion has excellent photographic properties resulting from the joint addition of the carbocyanine dye and monomethine cyanine dye, which properties are not attainable by the sole addition of any one of the two dyes.

The distribution of wavelength of the spectral sensitization maximum of the light-sensitive silver halide photographic emulsion according to this invention are variable in accordance with the kind of carbocyanine dye and monomethine cyanine dye and the ratio of addition thereof. Addition of such compounds to a silver halide photographic emulsion may be made in the form of solution in an organic solvent miscible with water such as methanol, ethanol, etc. The above compounds may be dissolved, respectively, and then added separately or together with each other. Alternatively, the compounds may be dissolved together and then added.

The compounds of the general Formulas 1 and 2 may be added to silver halide photographic emulsion at any stage of the preparation of the emulsion. In general, addition is preferably made immediately after the second ripening. The amount of the compounds added varies according to the kind of silver halide emulsion. The compounds of the general Formulas 1 and 2 are suitably added in a total amount of 30–100 mg. per kilogram of silver halide emulsion. This amount may be increased or decreased on occasion. The compound of the general Formula 2 preferably accounts for 10–70% of the total.

Any emulsion of silver bromoiodide-, silver chlorobromide-, silver bromide- and silver chloride emulsions may be used as the silver halide emulsion. Such emulsion may be sensitized by a noble metal-, sulfur-, reduction- or polyalkylene oxide sensitizer and may be added with ordinary additives such as stabilizer, surfactant, hardener, etc.

This invention is illustrated by way of the following examples which are given in order to exemplify several embodiments of this invention but not to limit the invention.

EXAMPLE 1

Immediately after the second ripening, 1 kg. of a neutral high-speed silver bromoiodide photographic emulsion containing 5 mol percent of silver iodide and having been sensitized by gold- and sulfur-sensitizations is added with a 0.1% methanol solution of compounds of the general Formulas 1 and 2 as combined in accordance with the Table 1 below. The resulting emulsion is then coated on a film base and dried.

The light-sensitive photographic material thus obtained is improved in spectral sensitivity and has desirable spectral sensitization region. It does not cause any disadvantageous reaction with other additives. Particularly, it does not cause deterioration of photographic properties due to the reaction with gelatin coagulant contained in the emulsion. Moreover, after the developing treatment, a film free from color staining and having very excellent photographic properties is obtained.

The light-sensitive photographic material thus obtained is exposed to light according to the JIS (Japanese Industrial Standard) No. K7610 method and treated with a developing solution at 20° C. for 5 minutes, the formulation of the developing solution being as follows:

|  | G. |
|---|---|
| Metol | 3 |
| Anhydrous sodium sulfite | 50 |
| Hydroquinone | 6 |
| Sodium carbonate (monohydrate) | 29.5 |
| Potassium bromide | 1 |

Water to make up to 1000 cc.

On use, the developing solution is diluted with one part of water per part of the solution.

The results of measurement of speed are shown in the Table 1 along with the result obtained with an emulsion which is added with any one of the compounds of the general Formulas 1 and 2 as controls. The amount is that added per kilogram of the emulsion.

TABLE 1

| Additive (cc.) (0.1% methanol solution of)— | | Relative speed of— | | | Sensitivity at— | |
|---|---|---|---|---|---|---|
| Compound 1 | Compound 15 | White light | Green light | Red light | Maximum (mμ) | Limit (mμ) |
| 30 | — | 320 | 10 | 8 | 630 | 660 |
| 50 | — | 330 | 12 | 10 | | |
| — | 30 | 280 | 9 | — | 550 | 580 |
| — | 50 | 330 | 13 | — | | |
| 30 | 20 | 450 | 25 | 17 | 620 | 655 |

As is obvious from the above table, compared with the case where any one of the compounds of the general Formulas 1 and 2 is used alone, the light-sensitive photographic material according to this invention has markedly improved spectral sensitization and the relative speed, and the ratio of GS/WS and the ratio of RS/WS are remarkably increased. Spectral sensitization was excellent over the entire visible region.

In the similar manner, 30 cc. of an 0.1% methanol solution of the compound 2 and an 0.1% methanol solution of the compound 15 are added together to 1 kg. of an emulsion. A light-sensitive photographic material having very excellent spectral sensitization similar to the previous material was obtained without causing any injurious effect on the photographic properties. Such spectral sensitization is not obtainable when any one of the compounds is used alone.

EXAMPLE 2

Immediately after the second ripening, 2 kg. of a neutral high-speed silver bromoiodide emulsion containing 5 mol percent of silver iodide and having been sensitized by the gold- and sulfur-sensitization is divided into two portions, each comprising 1 kg. of the emulsion. To each emulsion is added 0.1% methanol solution of the compounds of the general Formulas 1 and 2 combined as indicated in the Table 2. The resulting emulsion is coated on a support and dried.

The light-sensitive photographic material thus obtained had very excellent spectral sensitization over the entire visible region without causing any injurious effect on the photographic properties.

The photographic material is then exposed to light according to the JIS No. K7610 method, treated with the developing solution in the same manner as the Example 1 and then subjected to measurement of speed. The Table 2 shows the results of the measurement along with the control data obtained by using any one of the compounds alone. The amount shown is that added per kilogram of the emulsion.

TABLE 2

| Additive (cc.) (0.1% methanol solution) | | | Relative speed of— | | | Sensitivity at— | |
|---|---|---|---|---|---|---|---|
| Compound 5 | 12 | 13 | White light | Green light | Red light | Maximum (mμ) | Limit (mμ) |
| 50 | | | 310 | 5 | 34 | 650 | 680 |
|  | 50 |  | 340 | 11 | 9 | 630 | 690 |
|  |  | 50 | 330 | 15 |  | 550 | 580 |
| 20 | 20 | 10 | 440 | 29 | 56 | 650 | 680 |
| Compound 8 | Compound 11 | Compound 14 | | | | | |
| 50 | | | 320 | 4 | 33 | 650 | 680 |
|  | 50 |  | 350 | 14 | 12 | 650 | 690 |
|  |  | 50 | 330 | 16 |  | 550 | 580 |
| 20 | 20 | 10 | 420 | 31 | 54 | 650 | 680 |

As seen from the above table, compared with the case where any one of the compounds of the general Formulas 1 and 2 is used alone, spectral sensitization of the light-sensitive photographic material according to this invention is markedly improved and the relative speed and the ratio of GS/WS and the ratio of RS/WS are particularly increased. Spectral sensitization was excellent over the entire visible region.

EXAMPLE 3

Immediately after the second ripening, a silver bromoiodide emulsion (silver iodide content: 5 mol percent) which has been sensitized by gold- and sulfur-sensitization up to the maximum speed is divided into two portions each of which comprises 1 kg. of the emulsion. To each portion an 0.1% methanol solution of the compounds of the general Formulas 1 and 2 combined as indicated in the Table 3 below is added. Thereafter, the optimum amount of the stabilizer, 4-hydroxy-6-methyl-1,3,3a,7-tetraazaindene is added. Each of the resulting emulsion is coated on a film base and dried.

Both of the light-sensitive photographic materials thus obtained had excellent spectral sensitization over the entire visible region without being degraded in photographic properties.

The photographic materials are then subjected to light exposure according to the JIS No. K7610 method and treatment with the developing solution in the same manner as in Example 1. Measurements of speed and fog on the resulting photographic materials were made. The Tables 3 and 4 show the results obtained thereby along with the control data obtained by the single use of an additive. The amount of additive shown is that added per kilogram of the emulsion.

TABLE 3

| Additive (cc.) (0.1% methanol solution) of— | | Relative speed | | | | | | | | | | | Sensitivity at— | | Residual color density |
|---|---|---|---|---|---|---|---|---|---|---|---|---|---|---|---|
| | | Immediately after the preparation of emulsion— | | | | Incubated at 55° C. for 3 days after the preparation of emulsion— | | | | Incubated at 50° C. and 80% relative humidity for 3 days after the preparation of emulsion— | | | | | |
| Compound 3 | Compound 13 | Fog | White light | Green light | Red light | Fog | White light | Green light | Red light | Fog | White light | Green light | Red light | Maximum (mμ) | Limit (mμ) | |
| 50 |  | 0.03 | 320 | 14 | 9 | 0.04 | 330 | 15 | 10 | 0.04 | 320 | 14 | 9 | 630 | 655 | 0.5 |
|  | 50 | 0.03 | 340 | 17 |  | 0.03 | 340 | 17 |  | 0.03 | 350 | 18 |  | 550 | 580 | 0.03 |
| 30 | 20 | 0.03 | 440 | 30 | 21 | 0.03 | 450 | 32 | 23 | 0.03 | 440 | 31 | 22 | 520 | 655 | 0.03 |

As evidently shown by the above tables, compared with the case where any one of the compounds of the general Formulas 1 and 2 is used alone, the light-sensitive photographic materials according to the present invention are remarkably improved in spectral sensitization and the relative speed and the ratio of GS/WS and the ratio of RS/WS are increased. The supersensitivity is excellent over whole of the visible region. Moreover, durability of the photographic materials according to this invention is good after the incubation at 55° C. for 3 days or at 50° C. under 80% relative humidity for 3 days and the photographic properties are still excellent without causing any increase of fog, color staining and degradation of speed which are often encountered in the storage under severe conditions. Further, the residual color density measured with a color densitometer was very excellent.

What is claimed is:

1. A light-sensitive silver halide photographic emulsion which comprises a silver halide photographic emulsion in combination with a least one compound of the Formula 1 and a least one compound of the Formula 2:

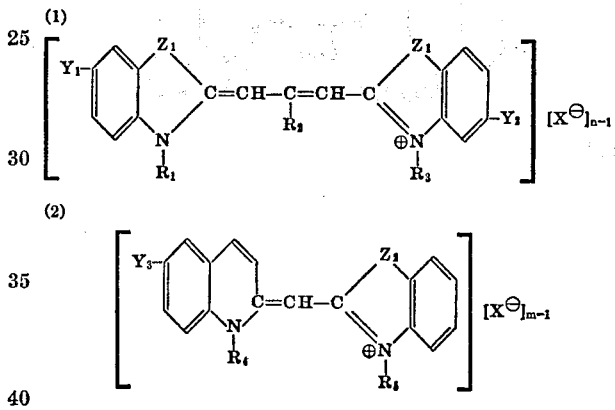

wherein $R_1$, $R_3$, $R_4$ and $R_5$ are each lower alkyl, hydroxyalkyl, carboxyalkyl group, a sulfoalkyl group or a sulfoalkyloxyalkyl group; $R_2$ is a lower alkyl group; $Z_1$ and $Z_2$ are each S or Se; $Y_1$ and $Y_2$ are each hydrogen, halogen, or lower alkyl group; $Y_3$ is hydrogen, lower alkyl or lower alkoxy group; X is an anion; $n$ and $m$ are each 1 or 2; said combination being so selected that at least one of $R_1$, $R_3$, $R_4$ and $R_5$ is a carboxyalkyl or sulfoalkyl group.

2. A light-sensitive silver halide photographic emulsion as claimed in claim 1 wherein the total amount of said compounds (1) and (2) is 30–100 mg. per kilogram of silver halide emulsion.

3. A light-sensitive silver halide photographic emulsion as claimed in claim 2 wherein the compound of Formula 2 constitutes 10–70% of the total amount.

4. A light-sensitive silver halide photographic emulsion as claimed in claim 1, further comprising a gold sensitizer.

5. A light-sensitive silver halide photographic emulsion as claimed in claim 1, further comprising a sulfur sensitizer.

6. A light-sensitive silver halide photographic emulsion as claimed in claim 1, further comprising a polyalkylene oxide sensitizer.

7. A light-sensitive silver halide photographic emulsion as claimed in claim 1, comprising one compound of the Formula 1 which has the structure:

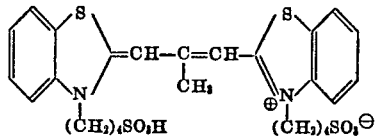

and one compound of the Formula 2 which has the structure:

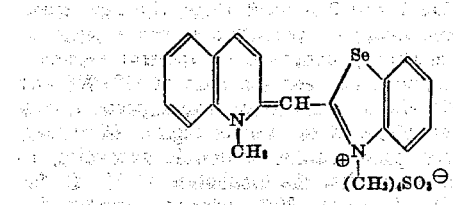

8. A light-sensitive silver halide photographic element which comprises a support, and coated on said support, a layer of the photographic emulsion as claimed in claim 1.

9. A light-sensitive silver halide photographic emulsion as claimed in claim 1, comprising two compounds of the Formula 1 which have the structures:

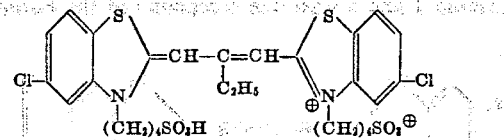

and

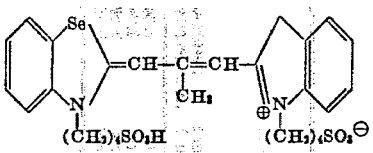

and one compound of the Formula 2 having the structure:

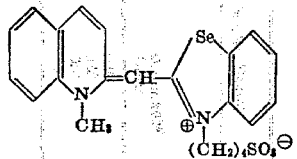

References Cited

UNITED STATES PATENTS

| | | | |
|---|---|---|---|
| 2,430,072 | 11/1947 | Nicholson et al. | 96—124 |
| 3,348,949 | 10/1967 | Bannert et al. | 96—124 |
| 3,615,634 | 10/1971 | Gotze et al. | 96—124 |
| 3,617,293 | 11/1971 | Shiba et al. | 96—124 |

FOREIGN PATENTS

| | | | |
|---|---|---|---|
| 748,750 | 5/1956 | Great Britain | 96—107 |

J. TRAVIS BROWN, Primary Examiner

U.S. Cl. X.R.

96—137